: 3,707,355
REACTOR APPARATUS
Fred T. Anderson, St. Petersburg, Fla., assignor to Gray
  Manufacturing Company, New York, N.Y.
Filed Dec. 11, 1970, Ser. No. 97,094
Int. Cl. C10b 7/12
U.S. Cl. 23—277 R                           4 Claims

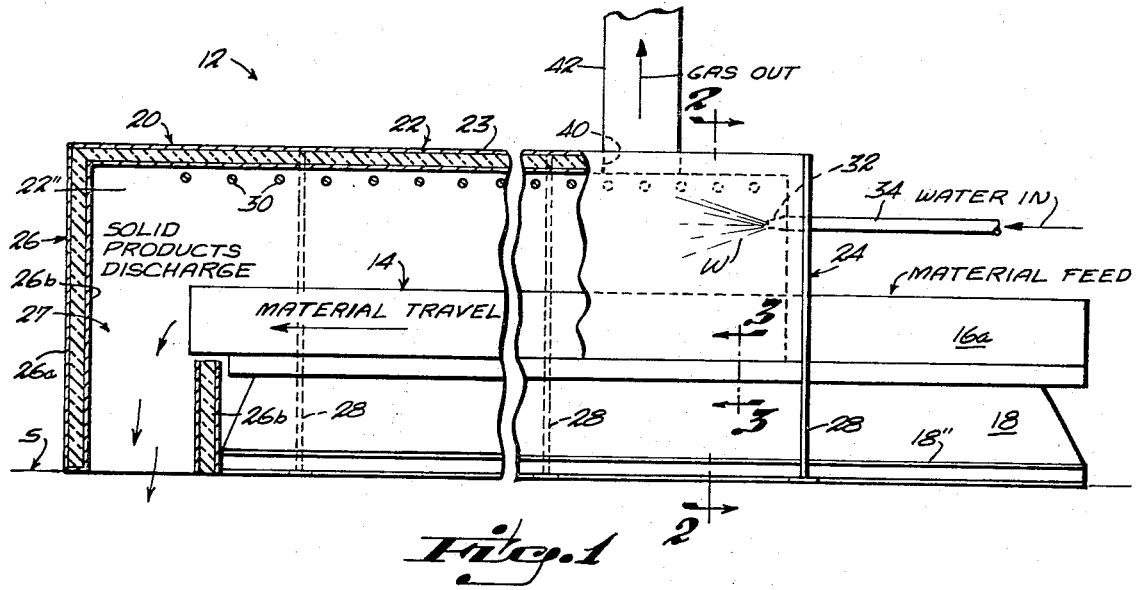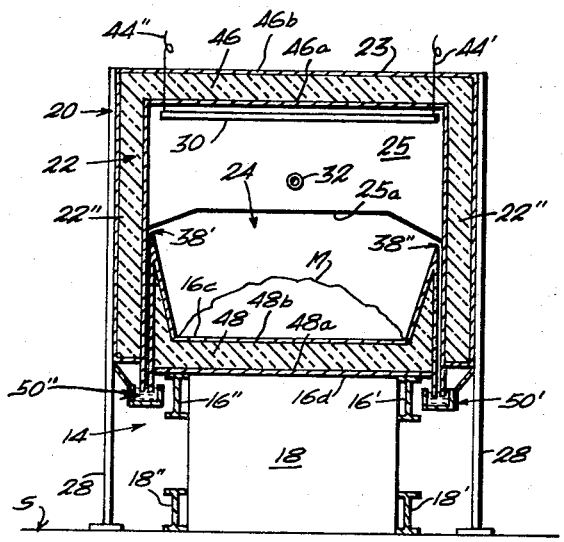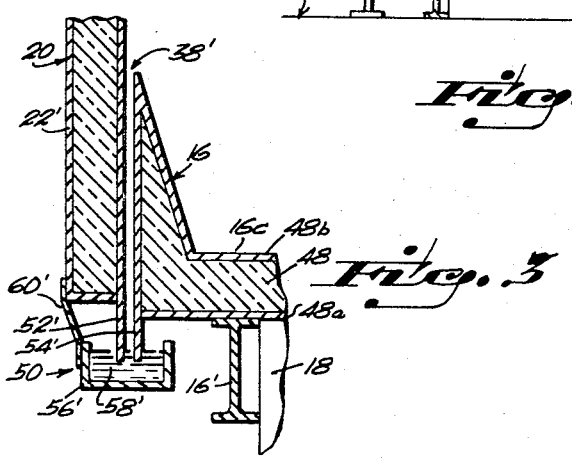

ABSTRACT OF THE DISCLOSURE

The apparatus includes a vibrating conveyor for conducting the waste material horizontally through a combustion chamber heated by electrical resistance elements. Steam barrier means is provided for excluding oxygen from the combustion chamber, affording pyrolysis decomposition of the waste material.

BACKGROUND OF THE INVENTION

Field of the invention

The invention relates to waste material disposal and reclamation apparatus and particularly relates to such apparatus utilizing methods of carbonization or pyrolysis of waste material.

Description of the prior art

The utilization of pyrolysis techniques in waste disposal and in the carbonization of organic waste matter is, generally well known. Although presently, the primary method utilized in waste disposal is in direct flame contact in an incinerator, the reduction or carbonization of waste by pyrolysis has certain desirable features. For example, pyrolysis waste reduction forms carbon char, suitable for manufacturing carbon products useful in domestic and industrial environments. The carbon and gas products produced in pyrolysis are useful as heat energy, and as engine fuel for use in generating electricity or the like. The chief advantage of pyrolysis over incineration, however, is in the reduction of air pollution. In contrast to incineration methods, emitting large quantities of gas and particle pollutants into the atmosphere, there is nominal pollutant substances emitted in pyrolysis waste disposal.

The prior art waste disposal installations utilizing pyrolysis techniques, typically include a heated cylinder or drum through which the waste material passes. The interior of the combustion chamber cylinder is of low oxygen concentration, providing the pyrolysis effect and decomposition of the organic substance into carbon char. In certain installations, the drum is rotated concentrically of a fixed agitator member extending through the drum interior. In other installations, the drum is fixed and the agitator in the drum interior is rotated. A particular difficulty in either instance is in obtaining proper occlusion of the drum interior from oxygen of the ambient atmosphere. A typical manner of circumventing this problem is the utilization of batch or intermittent feed of waste matter into the combustion chamber of the pyrolysis apparatus. In an installation such as this, the combustion chamber drum typically is shielded or enclosed in an outer casing or housing, excluding atmosphere from the combustion chamber during the batch processing of the material.

SUMMARY OF THE INVENTION

The instant invention provides an improved method and apparatus for pyrolysis and carbonization of organic waste matter. The particular configuration of the combustion chamber of the invention admits of continuous waste matter processing. By injecting fine spray particles of water into the heated combustion chamber interior, a shield or barrier of steam is formed at the waste material entrance of the chamber, preventing atmospheric oxygen from entering the chamber. The steam barrier means affords accurate temperature control of the combustion or carbonization process and more efficient operation. The reactor apparatus is easy to use and requires negligible repair and maintenance. The apparatus is of mechanically simple design admitting of economical manufacture and marketing.

BRIEF DESCRIPTION OF THE DRAWING

FIG. 1 is a schematic showing of the reactor apparatus, shown in side elevation and sectionalized for clarity;

FIG. 2 is a schematic showing in transverse section, taken as on the line 2—2 of FIG. 1; and FIG. 3 is a sectional view taken as on the line 3—3 of FIG. 1.

DESCRIPTION OF THE PREFERRED EMBODIMENT

The reactor apparatus is indicated by numeral 12 and in its basic form preferably includes conveyor means 14, including a trough-like bed 16 and means for vibrating the bed including a vibratory base assembly 18; housing structure 20 including a horizontal main section 22 defining an open passageway 24, and a discharge section 26; a series of heating elements 30 arranged in the housing main section 22 for heating the waste material M; and, water spray means for forming a steam barrier across the opening 24, including a spray nozzle 32 and water supply pipe means 34.

In operation of the apparatus 12, the organic waste material M is received on the upstream end portion 16a of the bed 16; by vibratory action of the base assembly 18, the material M is slidably conducted along the conveyor bed toward the vertical discharge section 26 of the housing. The rapid vibratory action of the base assembly 18 conducts the carbonized waste material over the discharge end 16b of the conveyor structure from whence it drops through the discharge passage 27 into receiver structure (not shown). In certain embodiments of the invention, the receiver structure may be in the form of conveyor mechanism or the like for conducting the solid material to another station for further processing. For example, in processing waste having cans, bottles and other non-combustible material, the discharge waste from the apparatus 12 may be conducted through magnetic separators, centrifugal force separators or the like for removing such material. Optionally, the removal of the non-combustible material may be carried out prior to or after passage through the reactor apparatus.

The base assembly 18 of the vibrating conveyor 14 includes mechanism (not shown) of known form for causing rapid vibratory impulses of the conveyor bed 16, for moving the material at a slow rate toward the discharge end of the conveyor. A pair of beam members 18', 18" may be provided for anchoring the conveyor base structure to a supporting surface S. The horizontally extending main section 22 of the housing structure preferably is elevatingly supported by leg members 28. The wall structure 26a, 26b of the housing discharge section 26 may be seated on the support surface S. The conveyor base assembly 18 and the housing 20 are supported stationarily one structure to the other, in corresponding longitudinal extension, and in a disposition providing slight clearance spaces 38', 38" parallel extending and respectively on opposite sides of the waste bed (see FIG. 2).

The conveyor bed 16 preferably is U-form in transverse section defining the longitudinally extending trough configuration. The upper surface 16c of the bed preferably is of longitudinally uniform smooth form, permitting the material to be slidingly vibrated toward the downstream portion of the conveyor structure. The bottom surface 16d of the conveyor bed is fixedly secured to the vibrating mechanism of the base assembly 18. A pair of beam members 16', 16" may be arranged on opposite sides of the base assembly, providing reinforcing means for the conveyor bed. The longitudinal extension of conveyor 14 and thus of the housing structure 20 is much longer than is suggested in the FIG. 1 illustration. The reactor apparatus 12 preferably is of substantial longitudinal extension, several yards long, permitting the material to have sufficient dwell in the heated interior of the housing section 22. The vibratory action of the conveyor 14 preferably is adjustable for regulating the rate of feed or travel of the material toward the downstream portion of the conveyor bed.

An outlet opening 40 formed in the housing main section 22, and conduit means 42 connected therewith, is operative for exhausting the combustion gases from housing 20. The gaseous products exhausting from the carbonization process may be conducted through the conduit means to another station or the like for further processing. In certain applications of the invention, the combustion gases may be used as fuel for internal combustion engines or in chemical processes. In such applications, the tars and acids of the combustion gases will be removed by passage through a condenser, air scrubber or the like.

The main section 22 of the housing 20 preferably is of inverted U configuration having parallel side walls 22', 22" and a top wall 23. The housing structure preferably includes a vertical forward wall 25 spanning the side walls 22', 22". The lower edge margin 25a of the forward wall defines in part the opening 24, providing an entrance for ingestion of the waste material into the housing main section.

The series of heating elements 30 preferably are of the electric current resistance type, energized respectively by electric leads 44', 44". The heating elements 30 preferably are arranged in the interior space of the housing, however, in certain applications of the invention, it may be desirable to utilize a heat source or heating elements arranged externally of the housing. In the utilization of an external heat source the housing preferably is of laminated or sandwich construction having heat insulation material 46 sandwiched between inner and outer sheet structure 46a, 46b respectively. The conveyor bed 16 also preferably is of insulated construction, having insulation material 48 sandwiched between inner and outer sheet structure 48a, 48b.

The spray nozzle means 32 is arranged in the upstream interior of the housing 20, preferably superjacently of the passageway 24. In operation, the atomized particles of water W issuing from the nozzle 32, upon contact with the heated air in the housing interior, vaporizes into steam, forming a barrier across the opening 24 for excluding entry of oxygen-bearing atmosphere into the housing interior. The steam barrier means affords a low concentration of oxygen in the combustion chamber of the housing, providing the pyrolysis action, and the decomposition and carbonization of the organic waste. A single water supply pipe 34 is shown extending through the forward wall 25 of the housing structure, providing a single nozzle for the atomized spray. It will be understood, that the showing is by way of illustration, and that various other nozzle configurations may be utilized for providing the atomized water in the housing of the apparatus.

A pair of air seal constructions 50, 50' preferably are provided for preventing passage of gases respectively through the clearance spaces 38', 38", parallel arranged on opposite sides of the conveyor bed (FIG. 3). The air seal constructions 50, 50" are of like design, including, as represented by construction 50', parallel arranged downwardly projecting flanges 52', 54' formed respectively on the lower edge margins of the housing side wall 22' and the conveyor bed 16. A tank 56' of channel configuration is stationarily supported directly subjacently of the flanges 52', 54'. The tank 56' is filled with a quantity of water 58'; the lower edge margins respectively of the flanges are submerged in the water 58', providing seal means preventing passage of gases through the clearance space 38'. An angular brace 60', or other suitable structure, stationarily supports the tank 56' from the lower edge margin of the housing side walls 22'. The air seal construction 50" is of corresponding form.

Although the reactor apparatus is described principally as being operative for processing organic waste material, it is considered useful in other applications. For example, the process of the apparatus may be utilized for reconstituting old rubber items such as automobile tires into carbon char or useable charcoal products. At the present time, a problem of critical import, is the disposal of used automobile tires and other rubber items; since the burning of such items causes severe air pollution, many municipalities or areas having ordinances against such practices. The carbonizing operation of the reactor apparatus is useful also for removing bonded or vulcanized rubber from metal and for other similar uses.

While the invention is disclosed in a preferred embodiment, it will be understood that it is presented in an exemplary manner and that various changes and modification may be made in the embodiment shown without departing from the spirit of the invention.

What is claimed is:

1. Reactor apparatus for reconstituting organic waste material into useable products, comprising material conveying means for causing continuous flow movement of the waste material in a path horizontally and then downwardly, housing means including a horizontally extending main section arranged directly over the horizontal path of movement of the waste material, and a downwardly oriented discharge section, means for heating the space within the main section of said housing means, operative for heating the material during horizontal movement, an outlet opening formed in said housing adapted for exhausting combustion gases of the material, and steam barrier means for preventing ambient atmosphere oxygen from entering the upstream portion of said housing main section, including water spray means for providing fine spray particles of water in said combustion chamber, vaporizing into steam upon contact with the heated air enclosed in the housing;

said material conveying means includes a horizontal conveyor reach correspondingly disposed in the main section of said housing means for causing horizontal movement of the material, said conveyor reach terminating in a discharge end portion, and wherein the downward movement of the material is of gravity drop configuration;

said horizontal conveyor reach includes an elongate bed adapted for receiving continuous loadings of the waste material, means for vibrating said bed in vibratory impulses causing movement of the material on the bed toward the discharge end of said conveyor reach; and said bed is generally U-shape in transverse section, having parallel sides, wherein said housing main section is generally inverted U-shape in transverse section, having parallel sides disposed contiguous respectively to the parallel sides of said bed, and air sealing means operatively interposed respectively between the parallel sides of said bed and housing, sealing said housing against entry of ambient atmosphere.

2. Reactor apparatus as set forth in claim 1 wherein said air sealing means includes an oppositely arranged pair of air seal constructions providing seal means respectively between the parallel sides of the bed and housing, each air seal construction including parallel downwardly projecting flanges respectively formed of the bed and housing structure, and a channel shaped tank holding a quantity of water, disposed correspondingly and directly subjacently of the pair of flanges, and with the water level of the tank being above the lower edge margins of said flanges.

3. Reactor apparatus for reconstituting organic waste material into useable products, comprising material conveying means to travel waste material in a path, housing means including a longitudinally extending main section arranged about the path of movement of the waste material, and including a downwardly oriented discharge section communicating with the conveying means, means for heating the space within the main section of said housing means, operative for heating the material during movement along the path, an outlet opening formed in said housing adapted for exhausting combustion gases of the material, and steam barrier means for preventing ambient atmosphere oxygen from entering the upstream portion of said housing main section, including water spray means for providing fine spray particles of water in said combustion chamber, vaporizing into steam upon contact with heated gas enclosed in the housing; said conveying means including an elongate bed adapted for receiving loadings of the waste material, means for vibrating said bed in vibratory impulses causing movement of the material on the bed toward the discharge section, and sealing means between said bed and housing to seal against passage of gas therebetween.

4. Reactor apparatus for reconstituting organic waste material into useable products, comprising vibratory material conveying means for causing continuous flow movement of the waste material in a path horizontally and then downwardly, said conveying means including means for causing vibratory impulses causing movement of the material on the bed, housing means including a horizontally extending main section arranged directly over the horizontal path of movement of the waste material, and a downwardly oriented discharge section, means for heating the space within the main section of said housing means, operative for heating the material during horizonal movement, an outlet opening formed in said housing adapted for exhausting combustion gases of the material, and steam barrier means for preventing ambient atmosphere oxygen from entering the upstream portion of said housing main section, including water spray means for providing fine spray particles of water in said combustion chamber, vaporizing into steam upon contact with the heated air enclosed in the housing.

References Cited
UNITED STATES PATENTS

| | | | |
|---|---|---|---|
| 2,063,784 | 12/1936 | Bechtel et al. | 266—4 E |
| 2,164,247 | 6/1939 | Knudsen | 202—269 X |
| 2,254,913 | 9/1941 | Roth | 266—4 X |
| 2,024,652 | 12/1935 | Martel | 110—10 |

JAMES H. TAYMAN, JR., Primary Examiner

U.S. Cl. X.R.

202—119; 110—18 E, 8 E, 109; 34—164; 263—21 C